United States Patent
Xu

(10) Patent No.: US 10,095,029 B2
(45) Date of Patent: Oct. 9, 2018

(54) ELECTRONIC APPARATUS AND METHOD FOR DISPLAYING VIRTUAL ENVIRONMENT IMAGE

(71) Applicant: Lenovo (Beijing) Co., Ltd., Beijing (CN)

(72) Inventor: Ben Xu, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 15/469,642

(22) Filed: Mar. 27, 2017

(65) Prior Publication Data

US 2018/0003967 A1 Jan. 4, 2018

(30) Foreign Application Priority Data

Jun. 30, 2016 (CN) .......................... 2016 1 0514281

(51) Int. Cl.
- *G02B 27/01* (2006.01)
- *G01S 5/16* (2006.01)
- *G01S 5/18* (2006.01)

(52) U.S. Cl.
CPC ............ *G02B 27/0101* (2013.01); *G01S 5/16* (2013.01); *G01S 5/18* (2013.01); *G02B 2027/014* (2013.01); *G02B 2027/0138* (2013.01); *G02B 2027/0192* (2013.01)

(58) Field of Classification Search
None
See application file for complete search history.

(56) References Cited

U.S. PATENT DOCUMENTS

| | | | | |
|---|---|---|---|---|
| 2015/0321606 A1* | 11/2015 | Vartanian | ........... | G02B 27/0101 348/148 |
| 2016/0027212 A1* | 1/2016 | Da Veiga | ........... | G02B 27/0172 345/633 |
| 2016/0062514 A1* | 3/2016 | Jo | ........................ | G02B 27/017 345/174 |

FOREIGN PATENT DOCUMENTS

| | | |
|---|---|---|
| CN | 103810353 A | 5/2014 |
| CN | 105446672 A | 3/2016 |
| WO | 2016036074 A1 | 3/2013 |

* cited by examiner

*Primary Examiner* — Ke Xiao
*Assistant Examiner* — Jed-Justin Imperial
(74) *Attorney, Agent, or Firm* — Anova Law Group, PLLC

(57) ABSTRACT

An electronic apparatus includes a controller, a display device coupled to the controller, and a detector coupled to the controller. The display device displays virtual environmental images. The detector detects a spatial parameter of a local space of the electronic apparatus in which the electronic apparatus is located. The controller receives the spatial parameter and controls the display device based on the spatial parameter.

10 Claims, 3 Drawing Sheets

ELECTRONIC APPARATUS AND METHOD FOR DISPLAYING VIRTUAL ENVIRONMENT IMAGE

CROSS-REFERENCES TO RELATED APPLICATION

This application claims priority to Chinese Patent Application No. 201610514281.1, filed on Jun. 30, 2016, the entire contents of which are hereby incorporated by reference.

TECHNICAL FIELD

The present disclosure generally relates to the field of multimedia technologies and, more particularly, to an electronic apparatus and a method for displaying a virtual environment image.

BACKGROUND

Virtual display technology can be implemented in various simulators to improve the simulation effect, and to improve the environment for modeling and simulation. Virtual simulation technology embeds a user into a simulation system, and enables the user to feel like being a part of the simulated environment. With the sensory organs, such as the eyes, nose, and ears of the user, being isolated from the actual external environment, the user can feel the virtually displayed information and can be more focused on the virtual display.

With the development of science and technology, more and more electronic apparatuses capable of showing images of virtual environment are widely used in people's daily life and work. These apparatuses have brought great convenience to people's daily life and work.

When a conventional electronic apparatus with virtual environment image display function is showing a virtual environment image, the space volume shown by the virtual environment image is fixed, or unchanged, limiting the environment in which the electronic apparatus can be used.

SUMMARY

One aspect of the present disclosure provides an electronic apparatus, including a controller, a display device coupled to the controller, and a detector coupled to the controller. The display device displays virtual environment images. The detector detects a spatial parameter of a local space of the electronic apparatus in which the electronic apparatus is located. The controller receives the spatial parameter and controls the display device based on the spatial parameter.

Another aspect of the present disclosure provides a displaying method, including: detecting a spatial parameter of a local space of an electronic apparatus in which the electronic device is located; and receiving the spatial parameter and controlling a display device of the electronic device based on the spatial parameter.

Other aspects of the present disclosure can be understood by those skilled in the art in light of the description, the claims, and the drawings of the present disclosure.

BRIEF DESCRIPTION OF THE DRAWINGS

The drawings described below only show some embodiments of the present disclosure, and it is possible for those ordinarily skilled in the art to derive other drawings from these drawings without creative effort.

DETAILED DESCRIPTION

Hereinafter, embodiments consistent with the disclosure will be described with reference to the drawings. Wherever possible, the same reference numbers will be used throughout the drawings to refer to the same or lite parts. The described embodiments are merely a part of, rather than all of, the embodiments of the present disclosure. On the basis of the disclosed embodiments, other embodiments obtainable by those ordinarily skilled in the art without creative effort shall fall within the scope of the present disclosure.

It has been known that, when a conventional electronic apparatus with virtual environment image display function is showing a virtual environment image, the space volume shown by the virtual environment image is fixed or unchanged, limiting the environment in which the electronic apparatus can be used.

The present disclosure provides an electronic apparatus. The electronic apparatus may include a detector, a controller, and a display device. The detector may detect spatial parameters of a space or environment in which the electronic apparatus is located. The controller may, based on the spatial parameters, drive the display device to display a virtual environment image that matches the spatial parameters. The virtual environment image displayed by the display device may include one or more images showing the environment or space. Hereinafter, the space in which the electronic apparatus is located is also referred to as a local space of the electronic apparatus.

The detector of the electronic apparatus may detect the spatial parameters of the space or environment when the electronic apparatus is displaying a virtual environment image. The electronic apparatus may, based on the spatial parameters reflecting the space, control the display device to display a virtual environment image. The displayed virtual space, reflecting the actual space or environment, may not need to be fixed. The electronic apparatus may display a virtual environment image based on the spatial parameters of the local space of the electronic apparatus. The electronic apparatus can be more conveniently used in different environments.

Figure 1:
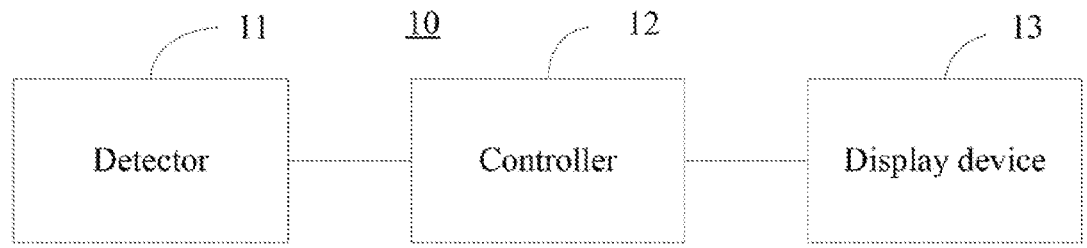
FIG. 1 illustrates an example of an electronic apparatus consistent with disclosed embodiments of the present disclosure.

FIG. 1, illustrates a structure of an example of an electronic apparatus 10 provided by the present disclosure. The electronic apparatus 10 includes a detector 11, a controller 12, and a display device 13. The detector 11 and the display device 13 are connected with the controller 12 through communication links. The detector 11 may detect the spatial parameters of the local space of the electronic apparatus 10. The controller 12 may, based on the spatial parameters, drive the display device 13 to display a virtual environment image that matches the spatial parameters. The virtual environment image displayed by the display device may include one or more images showing the environment or space.

The electronic apparatus 10 may, through the detector 11, collect the spatial parameters of the local space/environment of the electronic apparatus. The controller 12 may control the display device 13, based on the spatial parameters, to display the virtual environment image. The space volume for displaying the virtual environment image need not be fixed. The electronic apparatus 10 can display a virtual environment image based on the spatial environment. The use of the electronic apparatus 10 may be more convenient.

In some embodiments, the controller 12 may determine whether the local space of the electronic apparatus 10 has changed, based on the spatial parameters. For example, the controller 12 may compare current spatial parameters acquired at a present time and past spatial parameters acquired at a past time, and determine whether the local space of the electronic apparatus 10 has changed based on the comparison result. Based on the determination result, the controller 12 may control the display device 13 to display the virtual environment image. The change of space may include, changing of rooms, e.g., changing from one room to another. For example, the change of space may include changing from a bedroom to a study room, from a living room to a bedroom, from one bedroom to another bedroom, from an office to a lounge, from an indoor location to an outdoor location, or from an outdoor location to an indoor location. In various embodiments, the change of any suitable space/environment may be included.

Conventional virtual reality (VR) equipment or conventional augmented reality (AR) equipment often requires a fixed or a set space for display a virtual environment image. When the user moves from one space to another, and the current space is not a suitable space to display a virtual environment image, e.g., the current space may be too big or too small to display the virtual environment image, the conventional equipment cannot be used. For example, when the user moves from a bedroom to a study room or from a larger bedroom to a smaller bedroom, the dimensions of the space may be changed. As a result, the conventional VR/AR equipment may not function properly. When the space changes, the user may have to temporarily turn off the conventional VR/AR equipment until user returns to the previous suitable space or moves to another suitable space for displaying the virtual environment image.

In an electronic apparatus consistent with the disclosure, such as the electronic apparatus 10, the controller 12 may, based on the spatial parameters, determine whether the local space of the electronic apparatus has changed. Based on the determination result, the controller 12 may control the display device 13 to display a virtual environment image. Thus, the display of a virtual environment image, by the electronic apparatus consistent with the disclosure, is not limited to a fixed space. That is, the electronic apparatus consistent with the disclosure may adapt to the change in the space and display a virtual environment image accordingly.

When the spatial parameters of the local space of the electronic apparatus 10 has changed, e.g., when the electronic apparatus 10 has moved from one space to another, the controller 12 may control the operation of the display device 13 according to various different modes. Three examples of modes consistent with the disclosure are described below. For illustrative purposes, it is assumed that the user, wearing or carrying the electronic apparatus 10, has moved from a first space to a second space, and the first space and the second space may have different dimensions.

In some embodiments, the electronic apparatus 10 may include an input interface that allows the user to choose one of the three modes before starting to display a virtual environment image in the first space such that the displaying of the virtual environment image may be automatically controlled by the electronic apparatus 10 and may not be interrupted when the user moves from the first space to the second space. The input interface may include a touch screen and/or buttons. The user may choose to select from options including, for example, "stop displaying," "Continue to display the previous virtual environment image," or "start to display a virtual environment image that matches die current local space," before starting to display an image in the first space. The specific language to describe the modes, as prompted by the electronic apparatus 10, should not be limited by the description above.

In one mode, the controller 12 may control the display device 13 to stop displaying the virtual environment image.

In this mode, the detector 11 may detect the spatial parameters of the local space of the electronic apparatus 10 in real time, and may determine whether the local space of the electronic apparatus 10 has changed. When it is determined that the local space of the electronic apparatus 10 has changed by the spatial parameter detection, to avoid abnormal display of the virtual environment image caused by the change of local space, the controller 12 may control the display device 13 to automatically stop displaying the virtual environment image that is based on the spatial parameters of the first space. When the electronic apparatus 10 moves from the second space to the first space, the controller 12 may control the display device 13 to display the virtual environment image based on the spatial parameters of the first space.

In another mode, the controller 12 may drive the display device 13 to display a virtual environment image that matches second spatial parameters. The second spatial parameters may be the spatial parameters detected by the detector 11 of the electronic apparatus 10 in the second space. That is, when the electronic apparatus 10 moves from the first space to the second space, the controller 12 may control the display device 13 to change from displaying a first virtual environment image when the electronic apparatus 10 is in the first space to displaying a second virtual environment image when the electronic apparatus 10 is in the second space.

In this mode, similarly, the detector 11 may detect the spatial parameters of the local space of the electronic apparatus 10 in real time, and the controller 12 may determine whether the local space has changed based on the spatial parameters. When it is determined that the local space of the electronic apparatus 10 has changed through the spatial parameter detection, to avoid abnormal display of the virtual environment image caused by change of local space, the controller 12 may control the display device 13 to change the first virtual environment image to the second virtual environment image. Thus, when the local space of the electronic apparatus 10 changes, the electronic apparatus 10 may control the display device 13 to adapt to the change of space and display a suitable virtual environment image based on the change of space. Accordingly, the electronic apparatus 10 may display a virtual environment image normally when the user is moving, and the virtual environment image being displayed may match the spatial parameters of the user's current local space. Thus, the user may use the electronic apparatus 10 in various environments.

The virtual environment, image based on the spatial parameter of the first space may be referred to as the first virtual environment image. The virtual environment image based on the spatial parameter of the second space may be referred to as the second virtual environment image. In some embodiments, the first virtual environment image and the second virtual environment image may be two virtual environment images that have background environment images different from one another.

In another mode, the controller 12 may drive the display de vice 13 to display the virtual environment image matching first spatial parameters. The first spatial parameters may be the spatial parameters of the first space detected by the detector 11 of the electronic apparatus 10.

In this mode, similarly, the detector 11 may, in real time, detect the spatial parameters of the local space of the electronic apparatus 10, and the controller 12 may determine whether the local space has changed. When it is determined that the local space of the electronic apparatus 10 has changed through the spatial parameter detection, the controller 12 may control the display device 13 to directly display the first virtual environment image in the second space based on the spatial parameters of the first space.

When the first virtual environment image is displayed in the second space, if the space volume of the second space is greater than the space volume of the first space, the second space may have a sufficient space volume to display the first virtual environment image. A portion of the second space may nor be occupied by the first virtual environment image. As such, the display device 13 may control or adjust the content displayed in the first virtual, environment image to inform the user not to go to the portion of the second space not occupied by the first virtual environment image. Thus, it can be ensured that, when the user is moving in the second space, the user may not go beyond the first virtual environment image established based on the spatial parameters of the first space.

When the first virtual environment image is displayed in the second space, if the space of the first space is greater than the space volume of the second space, the controller 12 may control the display device 13 to not display the portion of the virtual environment image that exceeds the second space. That is, the first virtual environment image based on the spatial parameters of the first space may be displayed in the second space. However, because the first virtual environment image is initially displayed in the first space, which has a greater space volume than the second space, a portion of the first virtual environment image exceeds the second space and cannot be reached by the user. The display device 13 can be controlled to not display the portion of the first virtual environment image that exceeds the second space. By this way, it is easier for the user to move in the first virtual environment image without moving to the portion of the first virtual environment image that does not have an actual space volume. That is, the user may avoid moving to the portion of the first virtual environment image that exceeds the second space.

Figure 2:
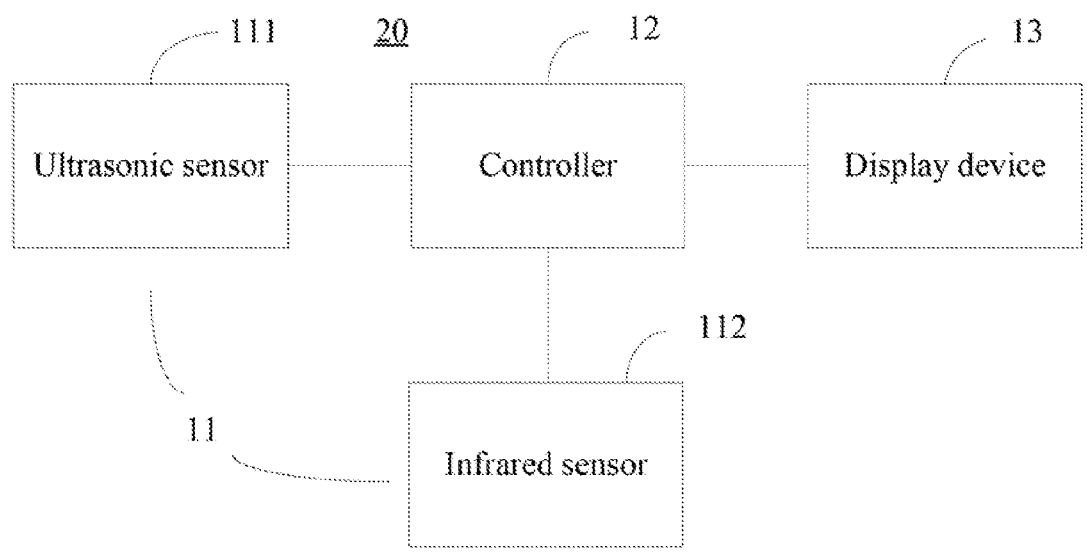
FIG. 2 illustrates another example of an electronic apparatus consistent with disclosed embodiments of the present disclosure.

FIG. 2 illustrates a structure of another electronic apparatus 20 provided by the present disclosure. The electronic apparatus 20 includes the detector 11, the controller 12, and the display device 13. In some embodiments, as shown in FIG. 2, the detector 11 includes an ultrasonic sensor 111. The ultrasonic sensor 111 may emit or generate an ultrasonic detection signal. The electronic apparatus 20 may determine the spatial parameters based on the reflected ultrasonic detection signal. The ultrasonic sensor 111 may be connected with the controller 12 through a communication link.

The controller 12 may determine the spatial parameters of a space through the ultrasonic sensor 111, and may further determine the space volume of the local space of the electronic apparatus 20. The controller 12 may also determine position data of an object in the space, and the volume of the object. The controller 12 may, based on the determination result, build a virtual environment image model for the local space, and control the display device 13 to display a virtual environment image based on the virtual environment image model. The ultrasonic sensor 111 may, based on the principles of ultrasonic positioning, determine the space volume of the local space of the electronic apparatus, the position data of the object in the space, and the volume of the object.

A three-dimensional Cartesian coordinate system O-XYZ may be established using the current position of the electronic apparatus 20 as the origin O. When the value of the reflected ultrasonic signal along one axis is zero or close to zero, or is smaller than a preset threshold value, it may be determined that the electronic apparatus 20 is located in a non-closed space. As such, the electronic apparatus 20 may display a virtual environment image within a first threshold distance along the axis. In some embodiments, one axis may correspond to a certain direction, pointing to or pointing from the current position of the electronic apparatus 20.

In some embodiments, as shown in FIG. 2, the detector 11 farther includes an infrared sensor 112. The infrared sensor 112, connected to the controller 12 through a communication link, may collect a biological infrared signal. The biological infrared signal may include the biological infrared signal emitted by an organism other than the user using the electronic apparatus 20. The controller 12 may, based on the biological infrared signal, control the display device 13 to display a virtual environment image that matches the biological infrared signal emitted by the organism. The position data of the organism, corresponding to the biological infrared signal, in the local space of the electronic apparatus 20, may be collected through the ultrasonic sensor 111. Thus, the position of the organism in the virtual environment image may change as the organism moves, and the virtual environment image may look more real and vivid.

Figure 6:
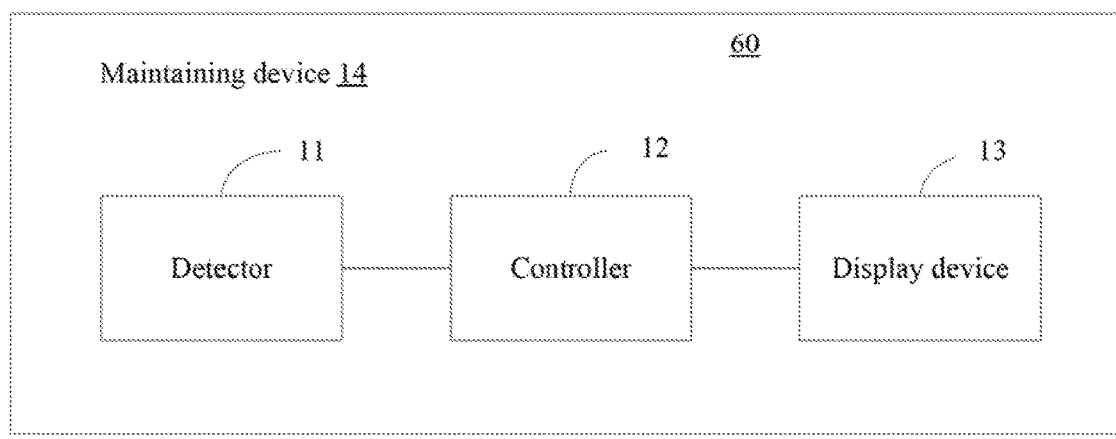
FIG. 6 illustrates an example of a maintaining device consistent with disclosed embodiments of the present disclosure.

In some embodiments, the electronic apparatus consistent with the disclosure, such as the electronic apparatus 10 or the electronic apparatus 20, may further include a maintaining device 14, as shown in FIG. 6. In the electronic apparatus 60, the detector 11, the controller 12 and the display device 13 may be arranged on the maintaining device 14. The maintaining device 14 may maintain the relative positions between the user and the electronic apparatus when the user is wearing/carrying the electronic apparatus. Specifically, the maintaining device 14 may include a helmet or a glasses/goggle frame. In various embodiments, the maintaining device 14 may include another suitable wearable item, e.g., a strap.

Thus, according to the disclosure, tire controller 12 may establish virtual environment image models based on the spatial parameters of the local space, of the electronic apparatus. For example, instead of one or more fixed virtual environment image models, the controller 20 can establish a plurality of suitable virtual environment image models based on different spatial parameters. The various virtual environment image models may be used in any suitable spaces for the display of a virtual environment image.

Figure 3:
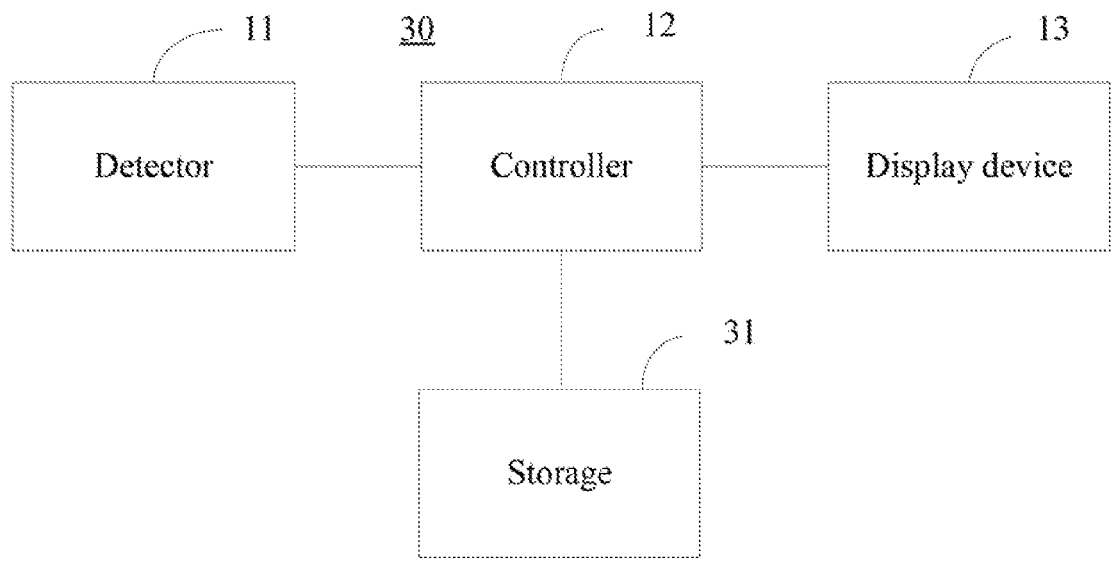
FIG. 3 illustrates another example of an electronic apparatus consistent with disclosed embodiments of the present disclosure.

FIG. 3 illustrates another example of an electronic apparatus 30 consistent with the disclosure. The electronic apparatus 30 is similar to the electronic apparatus 10 shown in FIG. 1, except that the electronic apparatus 30 further includes a storage 31. The storage 31 may store a plurality of sets containing image elements used for-establishing the virtual environment image models. A set may contain a plurality of image elements. The storage 31 may be connected with the controller 12 through a communication link. Based on the spatial parameters, when establishing the virtual environment image models using the image elements, the controller 12 can establish a plurality of different virtual environment image models based on different spatial parameters, without limiting to one or more fixed virtual environment image models.

According to the disclosure, the controller 12 may determine whether the local space of the electronic apparatus has changed based on the spatial parameters detected by the detector 11. Based on the determination result, the electronic apparatus may control the display device 13 to display a virtual environment image. Thus, the virtual environment image displayed by the electronic apparatus is not limited by a fixed space, and may be adjusted according to the change of the local space. Further, when the local space of the electronic apparatus changes, the display device 13 may be adjusted accordingly based on the change of the local space to control the display of the virtual environment image. Thus, it is easier for the user to use the electronic apparatus.

The detector 11 may include any suitable sensors and/or detectors that are capable of detecting spatial parameters of a space. The display device 13 may include any suitable display device, e.g., a screen or a projector, which is capable of display a virtual environment image.

For illustrative purposes, the present disclosure uses closed spaces, e.g., a room, to describe the functions of the electronic apparatus. In some embodiments, the user wearing/carrying the electronic apparatus may eaters non-closed space from a closed space or vice versa, or may walk through a combination of non-closed spaces and closed spaces. The working principles of the electronic apparatus are similar to those described above and should not be limited by the embodiments described herein.

Figure 4:
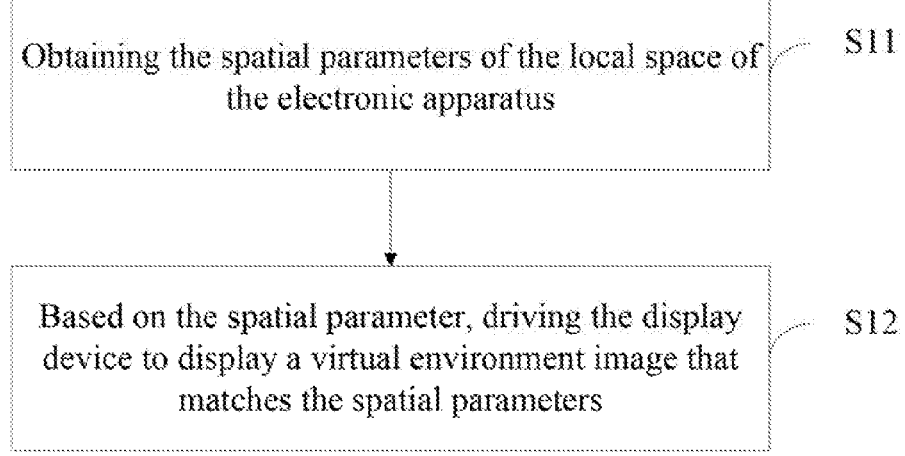
FIG. 4 illustrates an example of a process flow of virtual environment image display consistent with disclosed embodiments of the present disclosure.

Based on the disclosed electronic apparatus, the present disclosure further provides a method for displaying a virtual environment image using the disclosed electronic apparatus. FIG. 4 illustrates an example of a method to display a virtual environment image consistent with the embodiments of the present disclosure. As shown in FIG. 4, at S11, the electronic apparatus obtains spatial parameters of a local space of the electronic apparatus. At S12, the electronic apparatus drives a display device of the electronic apparatus to display a virtual environment image that matches the spatial parameters based on the spatial parameters.

In some embodiments, driving the display device to display the virtual environment image that matches the spatial parameters based on the spatial parameters may include determining whether the local space of the electronic apparatus has changed, and controlling the display device to display the virtual environment image based on the determination result.

In some embodiments, controlling the display device to display the virtual environment image based on the determination result may include, when the local space of the electronic apparatus changes, e.g., when the local space of the electronic apparatus has changed from a first space to a second space, controlling the display device to not display the virtual environment image.

In some embodiments, controlling the display device to display the virtual environment image based on the determination result may include: when the local space of the electronic apparatus changes, e.g., when the local space of the electronic apparatus has changed from the first space to the second space, the electronic apparatus driving the display device to display a virtual environment image that matches second spatial parameters. The second spatial parameters may be the spatial parameters detected by the detector of the electronic apparatus. In the second space.

In some embodiments, the electronic apparatus controlling the display device to display the virtual environment image based on the determination result may include: when the local space of the electronic apparatus changes, e.g., when, the local space of the electronic apparatus has changed from the first space to the second space, the electronic apparatus driving the display device to display the virtual environment image that matches the first spatial parameters. The first spatial parameters may be the spatial parameters detected by the detector of the electronic apparatus in the first space. In these embodiments, the electronic apparatus controlling the display device to display the virtual environment image based on the determination result may further include: when a space volume of the first space is larger than a space volume of the second space, stopping displaying a portion of the virtual environment image that exceeds the second space, or when the space volume of the first space is smaller than the volume of the second space, adjusting a content displayed in the virtual environment image to inform the user not to go to a portion of the second space not occupied by the virtual environment image.

In some embodiments, the method for displaying a virtual environment image may further include: the electronic apparatus collecting a biological infrared signal when collecting the spatial parameters in the local space of the electronic apparatus. The electronic apparatus may, based on the biological infrared signal, control the display device to display a virtual environment image that matches the biological infrared signal.

In the embodiments of the present disclosure, the disclosed method for displaying a virtual environment image may determine whether the local space of the electronic apparatus has changed, and display a virtual environment image based on the determination result. Thus, the disclosed method for displaying a virtual environment image is not limited to a certain fixed space, and may adapt according to the changes in space. When the local space of the electronic apparatus has changed, the electronic apparatus may control and adjust the display device, based on the change of local space, to control the displaying of the virtual environment image. Thus, the disclosed electronic apparatus may be easier to use by a user.

Figure 5:
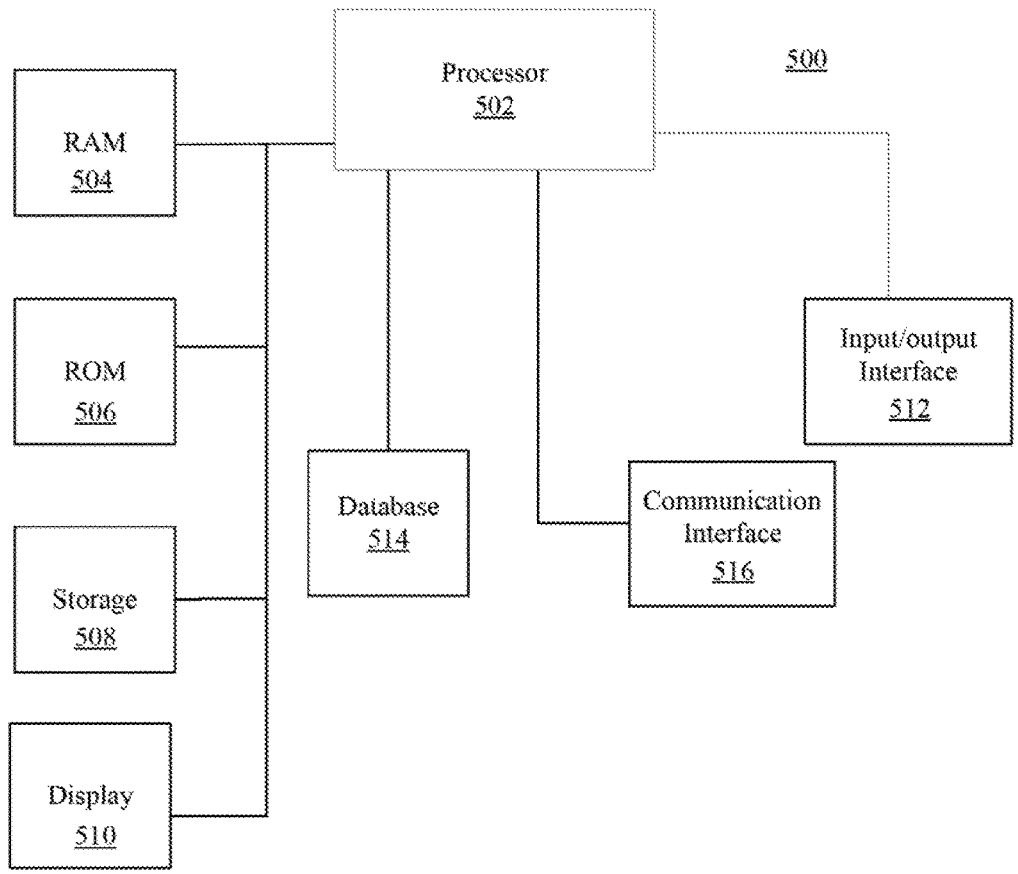
FIG. 5 illustrates a block diagram of an example of an electronic apparatus consistent with disclosed embodiments of the present disclosure.

FIG. 5 illustrates a block diagram of a controller 500, used as the controller 12, in various embodiments of the present disclosure.

The controller 500 may receive, process, and execute commands from the electronic apparatus. The controller 500 may include any appropriately configured computer system. As shown in FIG. 5, the controller 500 include a processor 502, a random access memory (RAM) 504, a read-only memory (ROM) 506, a storage 508, a display 510, an input/output interface 512, a database 514, and a communication interface 516. Other components may be added and certain components may be removed without departing from the principles of the disclosed embodiments.

The processor 502 may include any appropriate type of general purpose microprocessor, digital signal processor or microcontroller, and application specific integrated circuit (ASIC). The processor 502 may execute sequences of computer program instructions to perform various processes associated with the controller 500. Computer program instructions may be loaded into the RAM 504 for execution by the processor 502 from the read-only memory 506, or from the storage 508. The storage 508 may include any appropriate type of mass storage provided to store any type of information that the processor 502 may need to perform the processes. For example, the storage 508 may include one or more hard disk devices, optical disk devices, flash disks, or other storage devices to provide storage space.

The display 510 may provide information to a user or users of the controller 500. The display 510 may include any appropriate type of computer display device or electronic display device (e.g., CRT or LCD based devices). The input/output interface 512 may be provided for users to input information into the controller 500 or for the users to receive information from the controller 500. For example, the input/output interface 512 may include, any appropriate input device, such as a keyboard, a mouse, an electronic tablet, voice communication devices, touch screens, or any other optical or wireless input devices. Further, the input/output interface 512 may receive from and/or send to other external devices. In some embodiments, the input/output interface 512 may-include a detector for gathering the spatial parameters of the local space of the electronic apparatus.

Further, the database 514 may include any type of commercial or customized database, and may also include analysis tools for analyzing the information in the databases. The database 514 may be used for storing information for establishing a virtual environment model. The communication interface 516 may provide communication connections such that the controller 500 may be accessed remotely and/or communicate with other systems through computer networks or oilier communication networks via various communication protocols, such as transmission control protocol/internet protocol (TCP/IP), hyper test transfer protocol (HTTP), etc.

In one embodiment, a user may wear the electronic apparatus and start displaying a virtual environment image in a first room. The user may press a button on the electronic apparatus to choose to display a virtual environment image that matches the spatial parameters of the current local space. The electronic apparatus may first gather the spatial parameters of the first room, through the input/output interface 512, which obtains the spatial parameters from the detector, and send the spatial parameters to the processor 502. The processor 502 may execute certain predetermined programs from the storage or RAM and display a virtual environment image that matches the spatial parameters of the first room. When the user moves from the first room to a second room, the electronic apparatus may gather the spatial parameters of the second room through the input/output interface 512 and the detector, and send these spatial parameters to the processor 502. The processor 502 may compare the spatial parameters of the second room with the spatial parameters of the first room to determine whether the local space of the electronic apparatus has changed. Based on the determination result, the processor 502 may determine to start displaying a virtual environment image that matches the spatial parameters of the second room.

The embodiments of the present specification are described in a progressive manner, each of which is focused on the differences from other embodiments, and the various embodiments may be referred to for the same/similar parts between the various embodiments. For the disclosed method for displaying a virtual environment image, because it corresponds to the electronic apparatus disclosed in the embodiment the description is relatively simple, and the related information is described in the relevant part of the embodiments of the electronic apparatus. In the description of the embodiments, terms of"first", "second", and the like are only used to distinguish different objects and are not intended to suggest or indicate any differences in functions or orders.

The foregoing description of the disclosed embodiments will enable one skilled in the art to make or use the apparatus or method consistent, with the present disclosure. Various modifications to these embodiments will be apparent to those skilled in the art, and the generic principles defined herein may be embodied in other embodiments without departing from the spirit or scope of the disclosure. Accordingly, the disclosure is not to be limited to the embodiments shown herein, but is to be accorded the widest scope consistent with the principles and novel features disclosed herein.

What is claimed is:

1. An electronic apparatus comprising:
   a controller;
   a display device coupled to the controller, the display device displaying virtual environment images; and
   a detector coupled to the controller, the detector detecting a spatial parameter of a local space of the electronic apparatus in which the electronic apparatus is located,
   wherein the controller:
      receives the spatial parameter;
      determines, based on the spatial parameter, that the electronic apparatus has moved from a first space having a first spatial parameter to a second space having a second spatial parameter; and
      controls the display device to display a virtual environment image that matches the first spatial parameter.

2. The electronic apparatus according to claim 1, wherein in response to a space volume of the first space being smaller than a space volume of the second space, the controller controls the display device to inform a user of the electronic apparatus that a portion of the second space that exceeds the virtual environment image is unreachable.

3. The electronic apparatus according to claim 1, wherein in response to a space volume of the first space being bigger than a space volume of the second space, the controller controls the display device to not display a portion of the virtual environment image that exceeds the second space.

4. The electronic apparatus according to claim 1, wherein the detector includes an ultrasonic sensor, the ultrasonic sensor sending an ultrasonic signal and detecting the spatial parameter based on a reflected ultrasonic signal.

5. The electronic apparatus according to claim 4, wherein in response to the local space being a non-closed space determined based on a value of the reflected ultrasonic signal along a direction, the controller controls the display device to display the virtual environment image within a threshold distance along the direction.

6. The electronic apparatus according to claim 4, wherein:
   the detector further comprises an infrared sensor, the infrared sensor collecting a biological infrared signal, and
   the controller controls the display device to display the virtual environment image that matches the biological infrared signal.

7. The electronic apparatus according to claim 1, further comprising a maintaining device, wherein the display device, the detector, and the controller are mounted on the maintaining device and the maintaining device maintains a relative position between a user of the electronic apparatus and the electronic apparatus.

8. A displaying method comprising:
  detecting a spatial parameter of a local space of an electronic apparatus in which the electronic device is located; and
  receiving the spatial parameter and controlling a display device of the electronic device based on the spatial parameter, including:
    determining, based on the spatial parameter, whether the local space of the electronic apparatus has changed, including:
    determining that the electronic apparatus has moved from a first space having a first spatial parameter to a second space having a second spatial parameter; and
  controlling the display device based on a result of the determination, including:
    controlling the display device to display a virtual environment image that matches the first spatial parameter.

9. The method according to claim 8, wherein controlling the display device based on the result of the determination further includes, in response to a space volume of the first space being smaller than a space volume of the second space, controlling the display device to inform a user of the electronic apparatus that a portion of the second space that exceeds the virtual environment image is unreachable.

10. The method according to claim 8, wherein controlling the display device based on the result of the determination further includes, in response to a space volume of the first space being bigger than a space volume of the second space, controlling the display device to not display a portion of the virtual environment image that exceeds the second space.

* * * * *